Patented Nov. 21, 1939

2,180,418

UNITED STATES PATENT OFFICE 2,180,418

RESINIFICATION OF OXIDIZED TERPENE HYDROCARBONS

Joseph Hidy James, Pittsburgh, Pa., assignor to Clarence P. Byrnes, Sewickley, Pa., trustee No Drawing. Application October 1, 1935, Serial No. 43,082

1 Claim. (Cl. 260—2)

In various patents and pending applications, I have described my vapor or gaseous phase partial oxidation process, preferably in the presence of a catalyst, for making partial oxidation products from aliphatic hydrocarbons whether saturated or unsaturated, as well as from hydrocarbons containing cyclated bodies of naphthenic type; see for example, my re-issue Patent No. 18,522 dated July 12, 1932, and other of my patents, and copending applications Ser. No. 272,567 filed January 22, 1919, Patent No. 2,085,221; Ser. No. 435,355 filed January 6, 1921, Patent No. 2,054,571, and Ser. No. 310,437, filed October 4, 1928.

The partial oxidation product so produced contains groups of oxidized bodies in the range from alcohols to organic acids, each group or class containing similar bodies of different molecular weights. For example, there are alcoholic groups, ketonic groups, aldehydic groups, acidic groups, etc. I have found that excellent resins may be produced by combining the partially oxidized products or portions thereof with polyhydric alcohols, such as glycerol or glycol; and I have also found that even where the acid content is not of a dibasic type, but of an oxygenated type, the reaction with such polyhydric alcohols occurs. This, therefore, opens up a field for a large number of resin compounds which may be cheaply prepared, and especially from the liquid products produced by applying my vapor phase catalytic oxidation process to aliphatic or naphthenic hydrocarbons, and to terpenic hydrocarbons such as pine oil.

I have further discovered that my process is peculiarly adapted to the partial oxidation of terpenic hydrocarbons which are specially adapted therefor. The structure of such terpenic hydrocarbons is a ring type body having, however, a double bond so located that in my process the terpenes act more like aliphatic compounds than like aromatics. This double bond is so located that the structure is peculiarly open to oxygen attack by my vapor phase process. Consequently the process may be carried out at relatively lower temperatures than when applied to straight aliphatic hydrocarbons for example, at 200° C. or lower. Furthermore, the product thereof is peculiarly adapted for certain purposes such as resins. The process may be applied to all vaporizable terpenes, and especially to the turpentine and pine oil products of the Southern Pine Naval Stores Industry. Taking pine oil as an example from the Georgia plant of one of the large naval stores companies, this showed a composition of:

Alpha and beta pinene
Limonene
Dipentene
The terpinenes
Borneol
Fenchyl alcohol
Other compounds of the terpine group in small amounts Of these bodies, alpha pinene has the following cyclic structure:

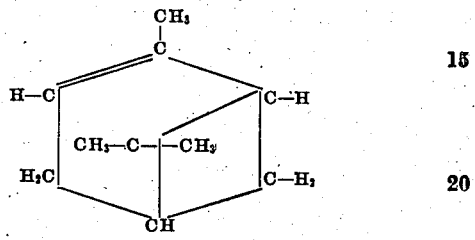

This cyclic structure has more of the aliphatic than of the aromatic characteristics and its double bond acts like an olefin, in my vapor phase process of oxidation.

The double bond in alpha pinene offers a point of oxygen attack, the result being the opening of the chain and, on a less degree of oxidation, forming a carboxyl group on one carbon atom at the rupture and a ketone group on the other. Still more vigorous oxidation would break the bond between the central carbon atom and the ring carbon to which it is attached, likewise introducing a hydroxyl ketonic group at the other. The process may be applied to other terpene hydrocarbons, producing intermediate oxidation products of the alcoholic, acidic, ketonic and aldehydic types. The resulting oxidation mixtures may either be subjected to methods of group separation or may be used in toto.

Example

Taking Georgia pine oil of a specific gravity at 60°=.936, Engler distillation; initial 190° C. 50% (by volume) passing over at 209° C. and an end point of 226° C.

The partial oxidation apparatus was of my triple-screen type, with molybdenum oxides as the catalyst, this being of the type which was non-volatile at the temperatures used. In such case air was added in front of the first screen and between the first and second screen and again between the second and third screen. The rate of feed into the vaporizer was 8 liters per hour and the air rates 62 liters of air per hour at the first screen; 50 liters of air per hour at the second screen, and 50 liters of air per hour at the third screen. The temperatures were maintained below the ignition point for such mixture and below that of continuous self-sustained complete combustion and in this case were about 430° C. in the vaporizer; 460° C. at the first screen, 460° C. at the second screen, and 500° C. at the third screen. During the run, 58 liters of oil were fed into the apparatus and 42 liters of oxidized product were obtained, giving a volume recovery of 68%. The condensed and recovered liquid product had the following properties: specific gravity at 60° F.=.948 Engler distillation; initial distillation at 90° C. 50% (by volume), passing over at 196° C. Decomposition of the residual liquid in the distilling flask started at about the 90% point where the temperature was 236° C. Sodium hydroxide saponification removed 50% by volume from the total oxidation mixture, showing the presence of a large amount of carboxylic acids. The sulphuric acid test gave a contraction of 64% by volume, while the sodium acid sulphite test for aldehydes and methyl ketones showed 10%.

Further proof that the greater part of the oil fed had been converted into partial oxidation products was shown by the fact that the total product dissolved nitrocellulose without any concentration of said oxidized product.

The partial oxidation product thus obtained may be used for several purposes. Among these would be the preparation of cellulose solvents and plasticizers; solvents for synthetic resins; using the oxidized product as raw material for the production of synthetic resins, either by polymerizing the product itself, or by combining it or products thereof with phenols or with polyhydric alcohols, or with combinations of them.

Changes may be made in the terpenic hydrocarbon used as raw material; one or more catalytic layers or screens may be used; a gaseous catalyst may be used or no catalyst at all; pure oxygen may be used instead of air; the process may be carried out at subatmospheric, atmospheric or superatmospheric pressures; partial oxidation products may be recovered by condenser-scrubber systems after each reaction and before the exit stream passes to another reaction chamber; in the plural-screen type; and other changes may be made in this step.

One of the important products obtained from such partial oxidation product or terpenes is the production of resins. I will now give examples of the production of resins from my partial oxidation products, and particularly as to three groups of resins, the first group being formed by the reaction between my partial oxidation products of aliphatic or terpenic hydrocarbons and polyhydric alcohols such as glycerol; the second group relating to the formation of resins by the reaction of the terpenic partial oxidation products with phenols and the third group to resins formed by adding the oxygenated acids to certain carbohydrates preferably in the presence of a catalyst.

First group: In this group, the oxygenated acids formed by my vapor phase catalytic air oxidation of Pennsylvania gas oil were combined with glycerol to form resins.

Example 1.—5 grams of oxygenated acids extracted from an oxidation mixture were heated with 20 cc. glycerol, using 2 cc. of concentrated hydrochloric acid solution as a condensing catalyst. The temperature was gradually raised to 110° C. in the course of an hour, and the heating continued at this temperature for about four hours. The liquid mass (liquid from excess of glycerol) was poured into 300 cc. of hot water to dissolve the unreacted glycerol. The washing was repeated until all the free glycerol was removed. The resin thus produced was of a brown color, showed darkening at 120° C. and on a melting point determination, it showed no fusion up to 240° C. It was insoluble in benzol, but dissolved in a solvent prepared from the vapor phase catalytic oxidation of naphthenic gasoline, such solvent containing alcohols, aldehydes, ketones and esters (1 part resin to 5 parts of solvent). On evaporation an excellent film which was hard and tough resulted.

Example 2.—5 grams of the oxidized product including oxygenated acids was combined with 2 cc. of denatured alcohol to aid in initial solution and reaction. A mixture was then made of this with 20 cc. of glycerine, using as a catalyzer one gram of anhydrous aluminum chloride. The mixture was gradually warmed up to 100° C. during one hour and heating continued at that temperature for about four and one-half hours. The treatment with water and washing to remove excess water and glycerol was the same as in Experiment 1. A resin was obtained which darkened at 210° C. and did not melt up to 250° C. It was not soluble in benzol or amyl alcohol. It dissolved (1 part to 20 parts) in the oxidized gasoline solvent above referred to and formed a very hard and tough film on evaporation.

Example 3.—Here I used a mixture of dibasic acid produced by a secondary oxidation of the partial oxidation product obtained by vapor phase oxidation of Pennsylvania spindle oil, nitric acid being used for this further oxidation. 5 grams of the dibasic acid thus obtained was combined with 20 cc. of denatured alcohol to dissolve the acids and then mixed with 20 cc. of glycerol and one gram of anhydrous aluminum chloride as a catalyst. The mixture was heated gently for 20 minutes to start the reaction and to evaporate the alcohol. The heating was continued at 110° C. for five hours. The remainder of the process was the same as in Example 1. Light brown resin was obtained with a melting point of about 48° C. This resin was readily soluble in benzol and on evaporation left a tough film, but not having the hardness of the film left by the evaporation of the oxidized gasoline solvent.

Example 4.—5 cc. of oxidized pine oil was mixed with 5 cc. of glycerine, using 1 gram of anhydrous aluminum chloride as a catalyst. The mixture was gradually heated up to 150° C. during three hours, and the heating continued at about that temperature for about three hours longer. A brown resin resulted which separated from the glycerine which had not entered the reaction. A melting point determination of the resin showed an initial softening at 84° C. and complete liquefaction at 95° C. In the solvent test, it was found easily soluble in benzol, forming a hard and brittle film on evaporation. It was also easily soluble in the oxidized gasoline above referred to, leaving a hard and tough film on evaporation. In this example, glycol may be used.

Example 5.—In this case 5 cc. of the oxidized pine oil was resinified by heating with 1 gram of anhydrous aluminum chloride as a catalyst. This was gradually brought up to 150° C. in one hour and heated at that temperature for about four hours longer. A hard brown resin resulted. A solvent test showed it was readily soluble in benzol, leaving on evaporation a non-uniform film of poor characteristics. In the oxidized gasoline above referred to, this resin dissolved readily, leaving a tough film which was somewhat tacky. The melting point determination of this resin showed initial softening at 90° C. and complete liquefying at 120° C.

Second group: In this group, resins were prepared by reacting an oxidized pine oil produced by catalytic vapor phase oxidation of terpene-hydrocarbon with phenol, using different catalysts. I have found that these terpene oxidation products condense of themselves to form resins, as shown in Example 5, and also readily condense with phenols making resins of remarkable quality.

Example 6.—5 cc. of oxidized pine oil was mixed with 5 cc. of phenol, using 1 gram of anhydrous aluminum chloride as a catalyst. This was heated to 180° C. for ten minutes, and then at 150° C. for five hours. A dark brown resin resulted which, on melting point determination, showed initial softening at 62° C. and complete liquefaction at 70° C. The resin dissolved readily in benzol, leaving a tough hard film. It dissolved even more readily in the oxidized gasoline above referred to and left on evaporation a gasoline film which was very hard and tough.

Example 7.—A mixture was made of 5 cc. of pine oil; 5 cc. of phenol and 1 cc. of caustic soda solution. This was heated for two hours at 150° C. and produced a resin which was solid at room temperature. It was a light brown color and softened at 89.5° C. and became completely liquid at 114° C. It dissolved with some difficulty in benzol, leaving a hard tough film. It was readily soluble in the oxidized oil solvent giving a very hard tough film on determination.

Example 8.—5 cc. of oxidized pine oil was mixed with 5 cc. of phenol and 1 cc. of aniline. After two hours heating at 150° C., the resin was solid at room temperature. It gave a sharp melting point at 70° C. and the resin was brown in color. In benzol it dissolved readily giving an excellent film—hard and tough. It dissolved easily in the oxidized gasoline solvent, giving an excellent film both as to hardness and toughness.

In the third group, resins are prepared by adding the oxygenated acids separated from my partial oxidation product, or the liquid product itself or part of it, to certain carbohydrates, preferably in the presence of a catalyst. Here, as in the glycerine reaction, the polyhydric alcohol groups of the carbohydrates react at the points in the oxygenated acids as before noted.

Example 9.—5 grams of my oxygenated acids made from gas oil and 5 grams of glucose were dissolved in 20 cc. of ordinary commercial alcohol with one-half gram of anhydrous aluminum added as a catalyzer. The solution was allowed to stand for 24 hours at room temperature and was then warmed to 50° C. and held there for 12 hours. A resin separated out and the alcohol was finally evaporated. The resin was washed with water and dried.

On test, the resin showed change in color at 120° C. and completely blackened at 150° C., without fusion. In 20 parts of benzol, solubility was difficult and the film was poor. In 20 parts of solvent made from oxidized kerosene, there was slow solution. The film was brown, slightly tacky and very tough.

The advantages of my invention result from the cheapness and excellent qualities of the resins produced. The polyhydric alcohols may be used with any of my products from the partial oxidation of mineral oil fractions and the products from the partial oxidation of terpene hydrocarbons give especially good resins in combination with phenols, and may also be directly polymerized with or without the use of a catalyst, especially by continued heating.

By the terms polymerizing or condensing as used herein, I mean the aggregating or clotting together of molecules, producing a material which is more like a resinous solid.

I claim:

In the treatment of a mixture of different terpene hydrocarbons, the steps consisting of heating said mixture and treating it with a gas containing free oxygen under conditions producing a liquid formed mainly of a plurality of oxygen derivatives of terpene hydrocarbons, and resinifying said product.

JOSEPH HIDY JAMES.